United States Patent [19]

Conlon, Jr.

[11] 3,863,856

[45] Feb. 4, 1975

[54] TAPE REEL DRIVE MECHANISM

[75] Inventor: Bartholomew F. Conlon, Jr., Waynesboro, Va.

[73] Assignee: General Electric Co., Lynn, Mass.

[22] Filed: Mar. 15, 1973

[21] Appl. No.: 341,368

[52] U.S. Cl. .......... 242/68.3

[51] Int. Cl. .......... B65h 19/02

[58] Field of Search .......... 242/68.3, 46.4, 129.7, 242/129.71, 130, 68, 72, 110, 110.1, 110.2, 110.3, 68.1, 68.2

[56] References Cited

UNITED STATES PATENTS

| | | | |
|---|---|---|---|
| 3,143,313 | 8/1964 | Purzycki | 242/72 X |
| 3,165,279 | 1/1965 | Remington | 242/130 |
| 3,278,134 | 10/1966 | Cochrane | 242/68.3 |
| 3,442,465 | 5/1969 | Lagergren | 242/72 |
| 3,521,828 | 7/1970 | Campbell | 242/68.3 |
| 3,558,072 | 1/1971 | Wakahara | 242/68.3 |
| 3,574,365 | 4/1971 | Bailey | 242/68.3 X |

*Primary Examiner*—John W. Huckert
*Assistant Examiner*—John M. Jillions

[57] ABSTRACT

A mechanism for driving a tape reel from a motor driven shaft. The reel drive mechanism has an axially bifurcated shaft forming opposed shaft segments. Resilient O-rings are located in radially recessed seats in the circumference of the bifurcated shaft. A pivotally mounted cam member has cam surfaces that can be rotated between the shaft segments to force them apart and expand the O-rings into forcible contact with the reel hub.

9 Claims, 5 Drawing Figures

TAPE REEL DRIVE MECHANISM

BACKGROUND OF THE INVENTION

This invention relates to an improved drive mechanism for securing a tape reel to a drive shaft and, more particularly, to a reel drive mechanism having an expandable shaft.

It has become common to record information on paper tape for subsequent use by data processing or control systems. One common apparatus for reading the information recorded on the paper tape is a tape reader/spooler in which the tape is driven from a supply reel, past a reading station and onto a take-up reel. Each reel is driven by a drive mechanism attached to the shaft of a reel motor, the motor being driven in one direction when the tape is being read and in the opposite direction after the tape has been read and it is desired to rewind the tape onto the supply reel for subsequent use or storage.

In the prior art tape reader/spooler systems, the reel drive mechanism included a collar portion and a fixed diameter shaft portion. The collar portion had a circular central opening so that the collar was placed over the shaft of a reel drive motor and secured thereto by means of set screws. The collar portion has several, typically three, driving lugs that extend axially from the collar and radially from the shaft. The tape reel has a central hub opening and drive slots extending radially from the hub opening so that the reel can be fitted over the fixed diameter shaft with the drive slots engaging the driving lugs. In order to guarantee that all such tape reels will fit all drive shaft members, it has been the practice to make the diameter of the shaft portion of the drive member, the diameter of the reel opening and the dimension of the driving lugs and slots in the reel such that the reel fits loosely over the reel drive member. As a result, there is play in three directions between the reel and the reel drive member. There is play in a direction parallel to the shaft axis, in a direction perpendicular to the shaft axis and there is also rotary play between the reel and the drive member. It can be appreciated that as the tape reader/spooler starts and stops, or reverses direction, the drive lugs will impact the walls of the slots in the reel. This constant impacting eventually causes chipping of the slots and eventually the reel becomes unusable. The impact forces due to rotary play, of course, act equally on the driving lugs and it has been found in some instances that the driving lugs have fatigued and eventually break off of the drive member. Although the damage resulting from rotary play has been emphasized, it is obvious that the wear on the reel resulting from play in the other two directions can be significant and that it would be desirable to substantially reduce or eliminate this play.

Another problem encountered with the prior art reel drive mechanism was relative motion between the motor driven shaft and the reel drive mechanism. This would occur if the set screws securing the collar to the motor driven shaft were not sufficiently tight initially or if they were loosened due to the impact forces acting on the reel drive mechanism.

It is, therefore, an object of this invention to provide an improved reel drive mechanism for positively transmitting the motor drive force to the reel thereby limiting relative motion between the drive mechanism and the reel.

It is another object of this invention to provide a reel drive mechanism that will result in less wear on the reel.

It is a further object of this invention to provide an improved means for securing the reel drive mechanism to a motor driven shaft.

SUMMARY OF THE INVENTION

Briefly, the reel drive mechanism of this invention has a drive member having a collar portion and a shaft portion extending from the collar. The surface of the collar from which the shaft portion extends acts as a reference surface when the reel is mounted thereon. Also extending axially from the collar and radially from the shaft are three drive lugs which engage corresponding drive slots in the reel. Part of the shaft including the end thereof is axially bifurcated to form opposed shaft segments. A pair of resilient O-rings are retained in radial recessed seats in the circumference of the bifurcated shaft. The diameter of the resilient O-rings is greater than the bifurcated shaft diameter and less than the diameter of the reel hub opening. A cam lever is rotatably mounted at the end of the bifurcated shaft between the shaft segments and a cam ball whose diameter is greater than the distance between the shaft segments is mounted in the cam lever. A reel placed on the drive member can be locked thereon by rotating the cam lever so that the cam ball is forced between the shaft segments causing the resilient O-rings to expand into forcible contact with the wall of the reel hub whereby substantially all relative motion between the reel and the drive member is eliminated and whereby the reel is locked into position against the collar reference surface.

In a preferred embodiment a stress relief hole provides the transition from the solid shaft portion and the bifurcated shaft segments.

The drive member is preferably secured to a motor driven shaft whose end is D-shaped. The collar has a matching D-shaped axial opening in its base located so that the axis of the collar is parallel to the axis of the motor driven shaft. A set screw in the collar wall opposite the flat wall of the D-shaped opening presses the flat surface of the motor driven shaft against the flat surface in the interior of the collar.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
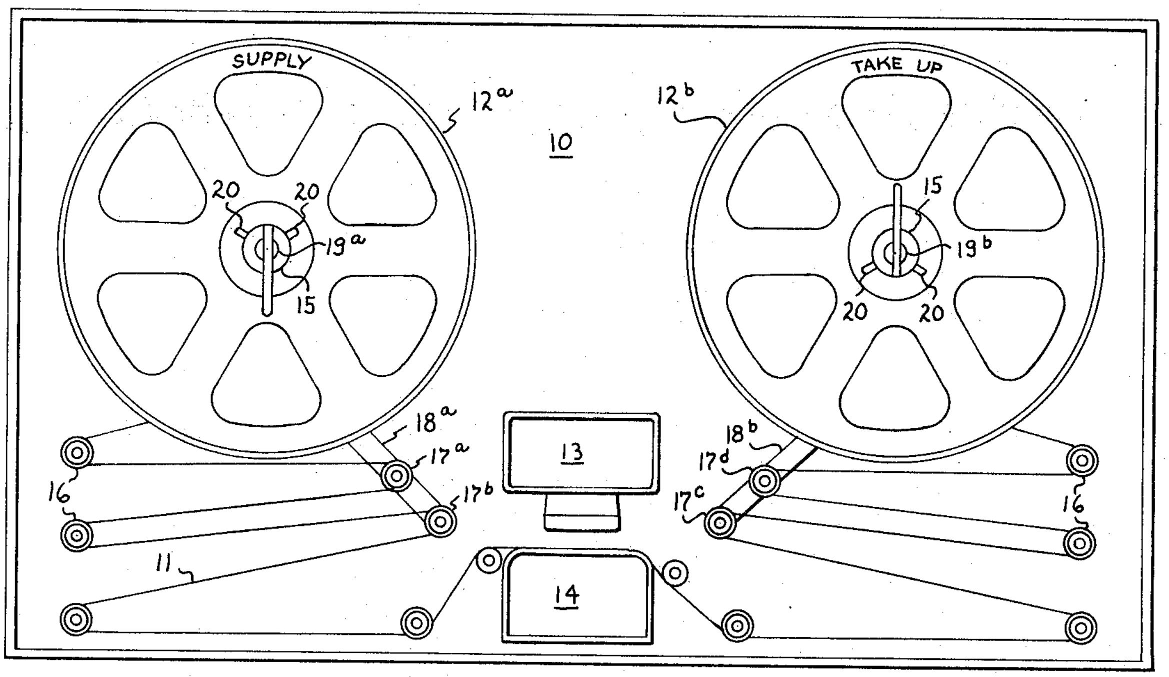
FIG. 1 depicts a tape reader/spooler that uses the reel drive mechanism of this invention.

Referring now to FIG. 1, there is shown generally a paper tape reader/spooler 10 wherein the paper tape 11 is being transported from a supply reel 12*a* past a reading station consisting of a light source assembly 13 and a photocell assembly 14 and to a take-up reel 12*b*. The paper tape is threaded over a series of fixed rollers 16 and over rollers 17*a* through 17*d* on tension arms 18*a* and 18*b*. The reel 12*a* and 12*b* have a central hub opening 15 and drive slots 20 extending radially from the central hub opening 15. The reels 12*a* and 12*b* are each driven by a reel drive mechanism 19*a*, 19*b*, the subject of this invention, attached to the shaft of a reel motor, not shown.

Figure 3:
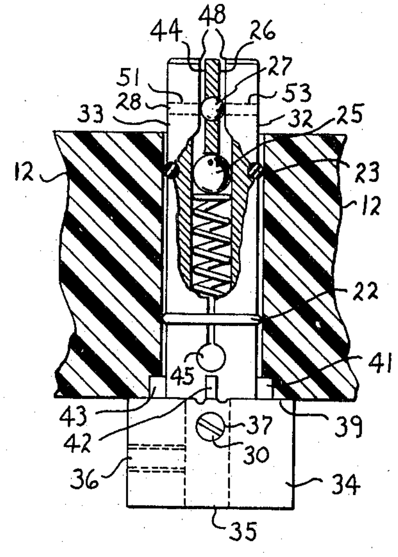
FIG. 3 is a view in elevation, partially cut-away, showing the reel drive mechanism in the locked position.
Figure 4:
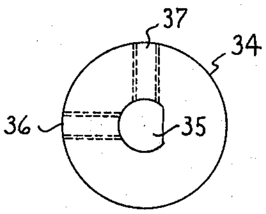
FIG. 4 is a bottom view of the collar portion of the reel drive mechanism.
Figure 2:
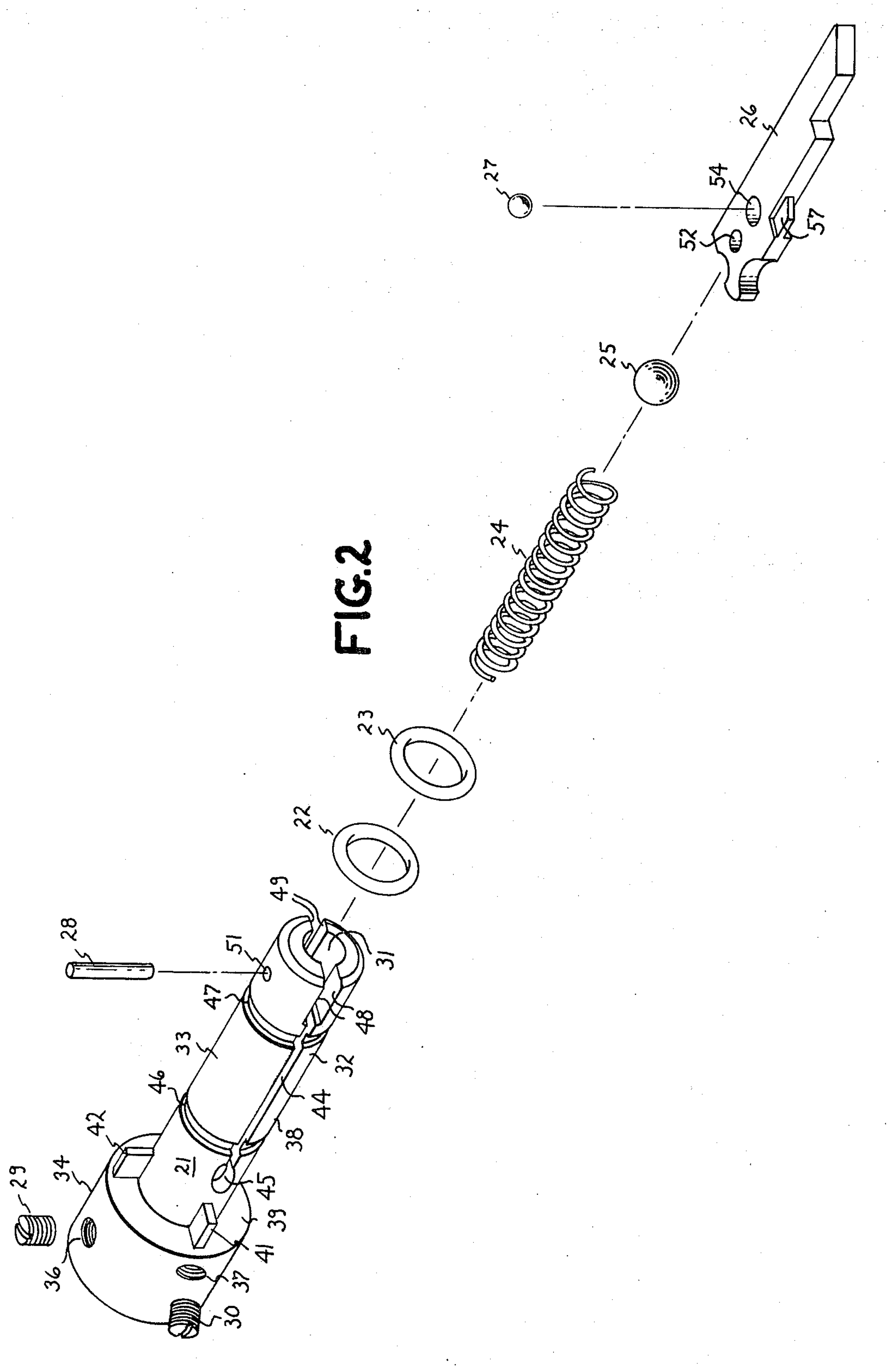
FIG. 2 is an exploded perspective of the reel drive mechanism.

For the sake of convenience, an element depicted in more than one FIGURE will retain the same element number in each FIGURE. Referring now to FIG. 2, a preferred embodiment of the reel drive mechanism 19 of this invention is shown to consist of a unitary drive member 21, a pair of elastic resilient O-rings 22, 23, detent spring 24, detent ball 25, cam lever 26, camming ball 27, lever pin 28 and set screws 29, 30. The unitary drive member 21, which is preferably made by casting, has an axially bifurcated shaft portion 38 resulting in opposed shaft segments 32 and 33 and a cylindrical collar portion 34. As best illustrated in FIGS. 3 and 4, the collar 34 has a D-shaped axial opening 35 extending into the collar and threaded holes 36 and 37 for accepting set screws 29 and 30, respectively. The threaded hole 36 is located in the wall of the cylindrical collar opposite the flat surface caused by the D-shaped opening 35 and the threaded hole 37 is located at right angles to threaded hole 36 but closer to the bifurcated shaft 38 than threaded hole 36.

As shown in FIG. 2, the collar 34 terminates in a reference surface 39 perpendicular to the axis of bifurcated shaft 38. Three drive lugs 41, 42 and 43 (not shown) are formed as integral extensions of the reference surface 39 and the shaft 38 such that the lugs extend radially from the shaft 38 and axially from reference surface 39 and are positioned at 120 degree intervals around the circumference of the shaft 38.

The shaft 38 is axially bifurcated into two halves by a slot 44 and a central opening 31 which extends through the shaft 38 and into the collar 34. The slot 44 extends axially from the tip of the shaft 38 and terminates in stress relief hole 45 extending through the shaft near its base. The portion of the slot 44 near the tip of the shaft 38 is wider than the portion of the slot that extends along the shaft 38 to the stress relief hole 45. The bifurcated shaft surfaces associated with the wider slot region form two pairs of camming flats 48 and 49. The shaft 38 also exhibits two radially recessed seats 46 and 47 located within the circumference of the shaft 38 at approximately one-third and two-thirds of the axial shaft length. Seats 46 and 47 are suitable for accepting and retaining the resilient O-rings 22 and 23 made of a material such as rubber.

The tip of the shaft 38 is adapted to receive cam lever 26 which is pinned therein by lever pin 28. Lever pin 28 is inserted through pin opening 51 in the tip of shaft 38, pin opening 52 in cam lever 26 and pin opening 53, as shown in FIG. 3, in the tip of shaft 38. The cam lever 26 is thereby free to rotate about lever pin 28 through the widened slot region to a position 90° out of alignment with the shaft axis. Camming ball 27 is pressed into cam ball opening 54, which is shaped to retain the camming ball 27, of cam lever 26, the cam ball opening 54 being in an axial line with the pin opening 52 and the distance of cam ball opening 54 from pin opening 52 places the center of cam ball opening 54 over the center of the camming flats either 48 or 49 when the cam lever 26 is rotated 90° out of alignment with the shaft axis. The cam lever 26 also has a tongue 57 adapted to engage one of the drive slots 20 in the reel 12.

Figure 5:
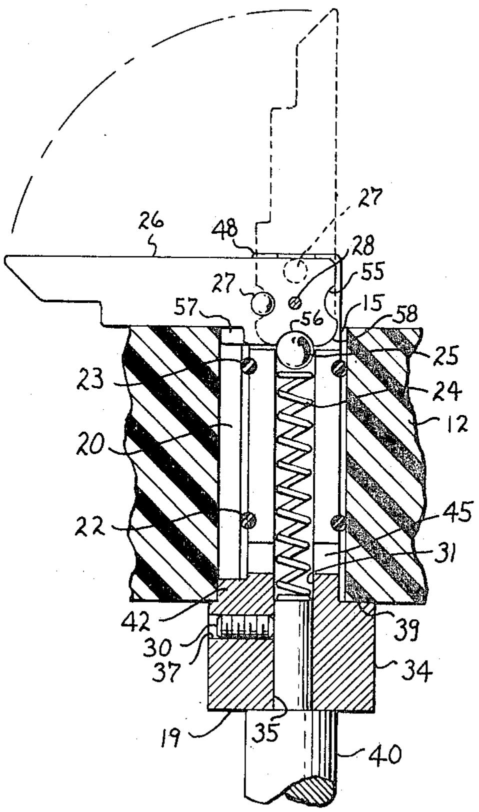
FIG. 5 is a cross-sectional view in elevation, showing the reel drive mechanism in the locked and unlocked positions.

As illustrated in FIGS. 3, 4 and 5, the collar 34 is placed over the motor drive shaft 40. The drive member 21 is secured to the motor drive shaft by first tightening set screw 29 in threaded hole 36 which forces the axis of the motor shaft to be parallel to the axis of the collar and then tightening set screw 30 in threaded hole 37 which forces the flat surface of the D-shaped motor shaft 40 into contact with the corresponding flat surface of collar 34, thereby preventing any significant relative motion between the collar 34 and the reel motor shaft 40.

As illustrated in FIG. 5, detent spring 24 and detent ball 25 are located in the central opening of the shaft 38 and are prevented from falling out the central opening 31 in the collar 34 by the end of reel motor shaft 40. It will be appreciated by one skilled in the art that other means can be used to retain the detent spring 24 such as a shoulder cast into the opening 31. When the cam lever 26 is assembled onto the shaft 38 in the unlocked position, which is with the long axis of the cam lever 26 in line with the shaft axis, detent ball 25 aligns and mates with detent recess 55, to assist in maintaining cam lever 26 in the unlocked position while a reel 12 is being placed upon the reel drive mechanism 19. The central hub opening 15 of the reel 12 passes over the outer periphery of the bifurcated shaft 38 and the outer periphery of the resilient O-rings 22 and 23 and the slots 20 in reel 12 engage drive lugs 41, 42 and 43 as the reel comes to rest against the reference surface 39 of collar 34. As the cam lever 26 is rotated 90 degrees about pin 28 into the locked position, the camming ball 27, set within the cam lever 26, makes contact with the cam flats 48 and the detent ball 25 is ridden out of detent recess 55 and into detent recess 56. The depth of detent recesses 55 and 56 and the rounded corner 58 of cam lever 26 are shaped to facilitate the riding out of detent ball 25 from the detent recess 55 as the cam lever is moved from the unlocked to the locked position. When the cam lever 26 is in the locked position, the tongue 57 of cam lever 26 will rest in the reel slot 20.

As best illustrated in FIG. 3, when the cam lever 26 is in the locked position, the camming ball 27, which has a diameter greater than the widened portion of slot 44, upon being urged between the cam surfaces 48, causes the bifurcated shaft segments 32 and 33 to diverge by an amount equal to the difference between the width of the slot and the diameter of the camming ball 27, whereby the resilient O-rings 22 and 23 are expanded into forcible contact with the walls of the central hub opening 15 of the reel 12. Since the distance between the opposed shaft segments 32 and 33 is greater at the cammed surfaces 48 than at the stress relief hole 45 where the shaft diameter is substantially fixed, one component of the compressive force is directed radially against the walls of the reel hub opening so as to lock the reel to the shaft 38 and another component of the compressive force is directed axially along the wall of the reel hub opening so as to urge the reel hub against the reference surface 39 of the collar 34. The forces acting on the wall of the reel hub opening 15 resists any forces acting on the reel tending to move the reel in a direction parallel or perpendicular to the axis of the shaft 38 and, additionally, practically eliminates any rotational backlash between the reel slots 20 and drive lugs 41, 42 and 43.

To unlock the reel 12, the cam lever 26 is rotated 90 degrees about pin 28, into alignment with the shaft axis thereby removing camming ball 27 from the widened slot. The bifurcated shaft 38 and the resilient O-rings 22 and 23 relax removing the forces that served to simultaneously lock and align the reel 12 with the reel drive member 21, thereby freeing the reel 12 for removal.

While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. A mechanism for driving a reel having a central circular hub opening from a motor driven shaft comprising:

a. a drive member having a collar and a cylindrical shaft portion extending from the collar, at least a part of the shaft portion including the end remote from the collar being bifurcated to form first and second spaced opposed shaft segments, the shaft portion being adapted to extend through and fit loosely within the reel hub opening;

b. a pivotally mounted cam means having cam surfaces rotatable into the space between the shaft segments so that the cam surfaces increase the space between the shaft segments thereby urging the shaft segments into forcible contact with the reel hub;

c. means for pivotally mounting the cam means to the remote end of the bifurcated shaft; and d. means for securing the collar to the motor driven shaft.

2. A mechanism as recited in claim 1 wherein the bifurcated shaft has at least one radially recessed seat and further comprises a resilient O-ring coaxially mounted within each of the recessed seats, and wherein the cam surfaces urge the shaft segments apart whereby the resilient O-rings are expanded into forcible contact with the reel hub.

3. A mechanism as recited in claim 1 wherein the cam means comprises a ball having a diameter greater than the unexpanded space between the shaft segments and a lever having a hole adapted to receive the ball, said ball providing the cam surfaces.

4. A mechanism as recited in claim 1 wherein the drive member includes a stress relief hole at the transition from the bifurcated shaft to the solid shaft.

5. A mechanism as recited in claim 1 wherein the reel additionally includes drive slots and wherein the drive member additionally includes drive lugs positioned to engage the reel drive slots.

6. A mechanism as recited in claim 1 wherein the end of the motor driven shaft is D-shaped and wherein the collar is adapted to fit over the motor driven shaft by means of a D-shaped opening in the end remote from the bifurcated shaft, the collar having a first radial threaded hole in the collar wall opposed to the interior flat surface of said D-shaped opening and intersecting said opening, and a second radial threaded hole angularly displaced from the first threaded hole and intersecting said opening, and wherein the securing means are first and second screws threaded into said threaded holes so that the axis of the collar is parallel to the axis of the motor driven shaft.

7. A mechanism as recited in claim 3 wherein the shaft portion has a central axial opening therein and wherein the lever has first and second detent recesses, said mechanism further comprising:

a. a detent spring located in the central axial opening of the bifurcated shaft;

b. means for retaining the detent spring within the shaft opening; and c. a detent ball located in the central axial opening; said detent spring urging the detent ball into the first detent recess when the ball is not between the shaft segments and the lever is in an unlocked position and into the second detent recess when the ball is increasing the space between the shaft segments and the lever is in a locked position, said lever being shaped to ride the ball out of the first recess as the lever is rotated from the unlocked to the locked position.

8. A mechanism for driving a reel having a central opening and drive slots extending radially from the central opening from a motor driven shaft comprising:

a. a drive member having a cylindrical collar and a shaft portion axially extending from the collar, the end of the collar from which the shaft portion extends forming a reference surface for the side of the reel, the reference surface being perpendicular to the shaft axis, the drive member having drive lugs axially extending from the reference surface and radially extending from the shaft portion and adapted to fit into the drive slots in the reel, at least a portion of the shaft including the end remote from the reference surface being bifurcated to form first and second geometrically spaced opposed shaft segments, the shaft portion having an axial central opening extending therethrough, the shaft also having two radially recessed seats located in the circumference of the bifurcated shaft at approximately one-third and two-thirds of the axial shaft length, the shaft being adapted to fit in and extend through the central opening of the reel;

b. first and second resilient O-rings having an outer diameter that is greater than the shaft diameter but less than the diameter of the reel opening, the O-rings being respectively retained in the recessed seats;

c. a camming ball having a diameter greater than the unexpanded space between the bifurcated shaft segments;

d. a cam lever having a hole adapted to securably receive the camming ball and having first and second detent recesses;

e. pin means for pivotally mounting the cam lever to the remote end of the bifurcated shaft;

f. a detent spring located in the axial opening in the bifurcated shaft;

g. a detent ball located in the axial opening and on top of the detent spring, the detent ball engaging the first detent recess when the camming ball is now between the shaft segments and the cam lever is in an unlocked position, the cam lever being rotatable so as to interpose the camming ball between the shaft segments whereby the shaft segments are urged apart and the O-rings are expanded into forcible contact with the reel hub, the cam lever being shaped to ride the detent ball out of the first detent recess and into the second detent recess when the lever is moved from the locked position to the unlocked position; and h. means for securing the collar to the motor driven shaft.

9. A mechanism as recited in claim 8 wherein the end of the motor driven shaft is D-shaped and wherein the collar is adapted to fit over the motor driven shaft by means of a D-shaped opening in the end remote from the bifurcated shaft, the collar having a first radial threaded hole in the collar wall opposed to the interior flat surface of said D-shaped opening and intersecting said opening, and a second radial threaded hole angularly displaced from the first threaded hole and intersecting said opening, and wherein the securing means are first and second screws threaded into said threaded holes so that the axis of the collar is parallel to the axis of the motor driven shaft.

* * * * *